United States Patent
Seo

(10) Patent No.: US 8,494,578 B2
(45) Date of Patent: Jul. 23, 2013

(54) METHOD FOR DISPLAY OF DUAL STANDBY PORTABLE TERMINAL AND APPARATUS THEREOF

(75) Inventor: Jung Sik Seo, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 254 days.

(21) Appl. No.: 12/647,662

(22) Filed: Dec. 28, 2009

(65) Prior Publication Data

US 2010/0167781 A1  Jul. 1, 2010

(30) Foreign Application Priority Data

Dec. 30, 2008  (KR) .................. 10-2008-0136495

(51) Int. Cl.
*H04W 88/06* (2009.01)
*H04W 88/02* (2009.01)
*G06F 13/14* (2006.01)

(52) U.S. Cl.
USPC .................. 455/552.1; 455/566; 345/520

(58) Field of Classification Search
USPC .................. 455/552.1, 553.1, 566, 562.1
See application file for complete search history.

(56) References Cited

U.S. PATENT DOCUMENTS

| | | | |
|---|---|---|---|
| 8,010,152 B2* | 8/2011 | Kim | 455/552.1 |
| 2002/0006808 A1* | 1/2002 | Onaka et al. | 455/550 |
| 2002/0173344 A1* | 11/2002 | Cupps et al. | 455/566 |
| 2003/0083097 A1* | 5/2003 | Kim | 455/553 |
| 2003/0125073 A1* | 7/2003 | Tsai et al. | 455/552 |
| 2004/0142725 A1* | 7/2004 | Kim | 455/556.1 |
| 2005/0160069 A1* | 7/2005 | Park et al. | 707/1 |
| 2005/0249146 A1* | 11/2005 | Pinault et al. | 370/328 |
| 2006/0013176 A1* | 1/2006 | De Vos et al. | 370/338 |
| 2006/0073829 A1* | 4/2006 | Cho et al. | 455/439 |
| 2006/0234693 A1* | 10/2006 | Isidore et al. | 455/422.1 |
| 2007/0033348 A1* | 2/2007 | Oh | 711/149 |
| 2007/0105531 A1* | 5/2007 | Schroeder, Jr. | 455/411 |
| 2007/0136536 A1* | 6/2007 | Byun et al. | 711/149 |
| 2007/0140255 A1* | 6/2007 | Gautier et al. | 370/395.5 |
| 2008/0020765 A1* | 1/2008 | Black et al. | 455/435.2 |
| 2008/0020773 A1* | 1/2008 | Black et al. | 455/445 |
| 2008/0096603 A1* | 4/2008 | Sparre | 455/550.1 |
| 2008/0102874 A1* | 5/2008 | Gautier et al. | 455/522 |
| 2008/0117876 A1* | 5/2008 | Hidaka et al. | 370/331 |
| 2008/0318621 A1* | 12/2008 | Fan et al. | 455/552.1 |
| 2009/0064186 A1* | 3/2009 | Lin | 719/315 |
| 2009/0069918 A1* | 3/2009 | Seo | 700/94 |
| 2010/0149120 A1* | 6/2010 | Lee et al. | 345/173 |

* cited by examiner

*Primary Examiner* — Nay A Maung
*Assistant Examiner* — Erica Fleming-Hall
(74) *Attorney, Agent, or Firm* — Cha & Reiter, LLC

(57) ABSTRACT

Provided is a display method of a dual standby portable terminal, which includes checking a connection state of a switching unit, when a main controller senses an event; displaying data corresponding to the event to a display unit by the main controller, when the main controller is connected with the display unit; and connecting the display unit with a sub-controller, when control information is received from the sub-controller.

18 Claims, 7 Drawing Sheets

METHOD FOR DISPLAY OF DUAL STANDBY PORTABLE TERMINAL AND APPARATUS THEREOF

CLAIM OF PRIORITY

This application claims the benefit of the earlier filing date, under 35 U.S.C. §119, to that Korean patent application filed in the Korean Intellectual Property Office on Dec. 30, 2008 and assigned Serial No. 10-2008-0136495, and the entire disclosure of which is hereby incorporated by reference

BACKGROUND OF THE INVENTION

1. Field of the Invention

The present invention relates to a display system and more particularly, a method controlling a display screen.

2. Description of the Related Art

Generally, a portable terminal is equipped with various functions to perform a complex function. Recently, a dual mode portable terminal has been introduced, which can communicate through at least two wireless communication networks. Such a dual mode portable terminal can communicate by being individually connected to one wireless communication network selected by a user among a plurality of wireless communication networks. However, a mode conversion for using at least two wireless communication networks is needed in a dual mode portable terminal.

Accordingly, a dual standby portable terminal has been suggested, which can be simultaneously connected to at least two wireless communication networks. Such a dual standby portable terminal includes at least two communication modules which can be simultaneously connected to at least two wireless communication networks. Also, a dual standby portable terminal can perform a call mode through one of communication modules. That is, a dual standby portable terminal can easily change the mode for using different wireless communication networks.

However, in a dual standby portable terminal, one of the two controllers (i.e., the main controller) controls the screen, and the other controller (i.e., the sub-controller) manages the SIM (Subscriber Identity Module) and performs control regarding calls. Here, the dual standby portable terminal has two controllers having a similar structure, but a controller which controls the screen is deemed to be the main controller. Hence, after data is transmitted to the main controller using DPRAM (Dual Port Random Access Memory), the main controller performs functions related to events that have occurred with regard to a telephone, so as to display data corresponding to those events generated in the sub-controller.

Additionally, a large-capacity DPRAM is required to display a large amount of data generated by the sub-controller, thereby increasing costs, and power consumption increases as both the main controller and the sub-controller cannot enter the standby mode.

SUMMARY OF THE INVENTION

The present invention provides a method and apparatus of a dual standby portable terminal in which two controllers can control a screen using a switch function.

The present invention further provides a display method and apparatus of a dual standby portable terminal in which one controller can be maintained a standby mode while the other controller controls a screen.

In accordance with another aspect of the present invention, a display method of a dual standby portable terminal includes: checking a connection state of a switching unit, when a main controller senses an event; displaying data corresponding to the event to a display unit by the main controller, when the main controller is connected with the display unit; and connecting the display unit with a sub-controller, when control information is received from the sub-controller.

In accordance with another aspect of the present invention, a dual standby portable terminal includes: a switching unit that switches a connection of a display unit according to a control signal for switching the connection of the display unit; a sub-controller that transmits control information to a main controller, and displays data corresponding to event to the display unit in case of being connected to the display unit; and a main controller which transmits to the switching unit the control signal for switching the connection of the display unit to the sub-controller, when the control information is received from the sub-controller.

In accordance with another aspect of the present invention, an apparatus for managing a display screen in a dual standby terminal comprising: a first processor in communication with a first memory, the first memory including code which when accessed by the processor causes the processor to: receiving an first event from a receiving system associated with a first communication system; a second processor in communication with a second memory, the second memory including code which when accessed by the processor causes the processor to: receiving an second event from a receiving system associated with a second communication system; a display unit for displaying information associated with at least one of the first event and the second event; a switching unit, receiving control inputs from the first processor; for switching an input of the display between an output of each of the first and second processors, and a dual-port RAM, in communication with the first and second processors, wherein control information in the dual-port RAM causes the switch to create a path between the second processor and the display unit.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the embodiment of the present invention, a portable terminal is a dual standby portable terminal. It supports various communications method including the CDMA (Code Division Multiple Access), the GSM (Global System for Mobile communication), and the WCDMA (Wideband Code Division Multiple Access), and can connect to at least two wireless communications networks selected from a plurality of wireless communications networks. Additionally, for the convenience of illustration, it is assumed that the portable terminal is simultaneously connected to two wireless communications networks. However, the present invention can be also implemented even in the case where the portable terminal of the present invention is connected to three or more wireless communications networks.

In the embodiment of the present invention, the term 'event' refers to an event that indicates an image, a text or the like on a screen of the portable terminal that may be received from a short message service (SMS) or a multimedia message service (MMS) or the like.

In the embodiment of the present invention, the term 'control information' refers to an information that a sub-controller provides to a main controller to request a connection with a display unit so as to present data corresponding to an event. That is, if control information is transmitted from the sub-controller, the main controller transmits a control signal to a switching unit. At this time, the control signal can be a signal that switches the switching unit so that the display unit and the sub-controller may form an interface path. Here, the control information can be transmitted through a dual-port RAM.

Figure 1:
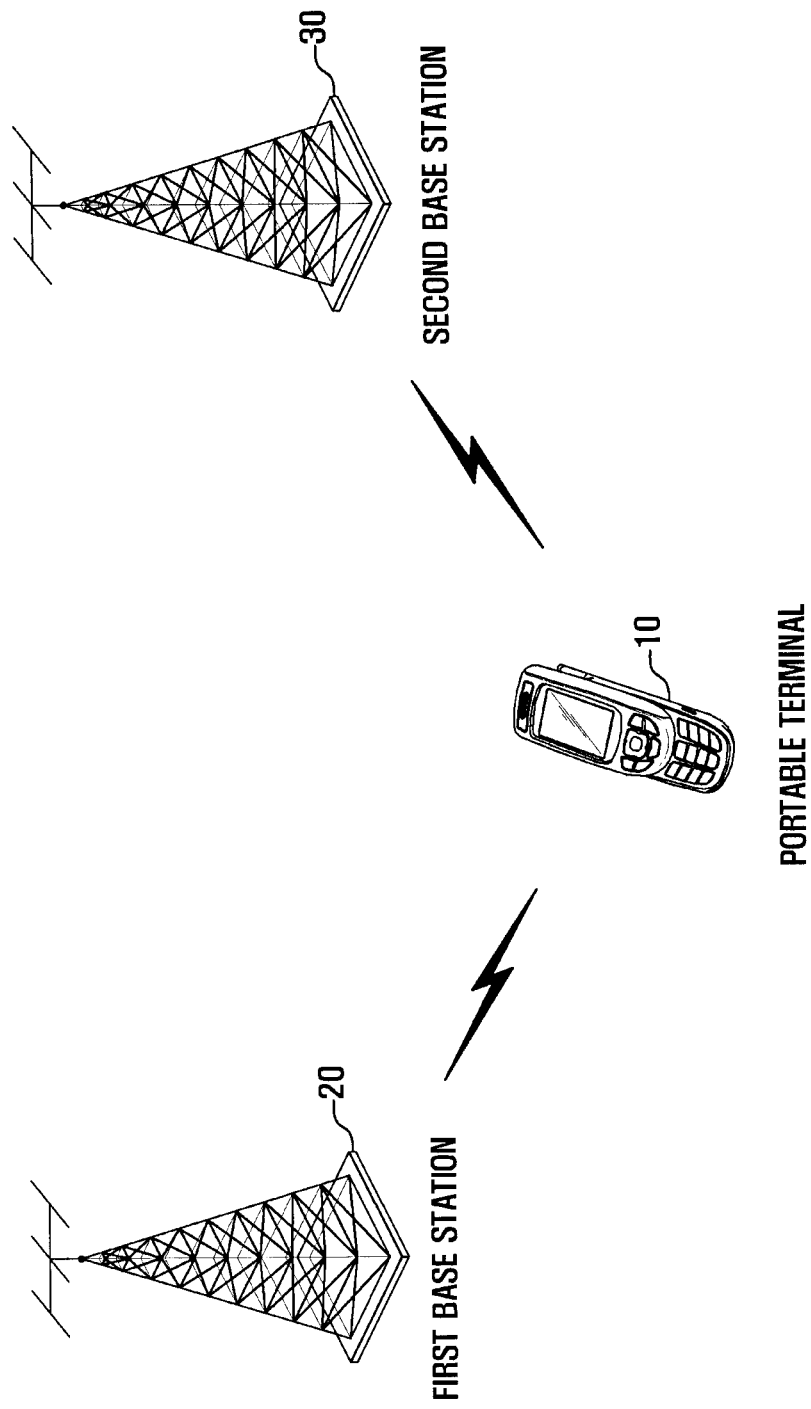
FIG. 1 schematically illustrates a communication system including a dual standby portable terminal according to an exemplary embodiment of the present invention.

FIG. 1 schematically illustrates a communication system including a dual standby portable terminal according to an exemplary embodiment of the present invention.

Referring to FIG. 1, the communications system according to an exemplary embodiment of the present invention includes a portable terminal 10, a first base station 20, and a second base station 30. At this time, the first base station 20 supports a first wireless communications network and the second base station 30 supports a second wireless communications network. Here, the first base station 20 can transmit a signal of an event through the first wireless communications network to the portable terminal 10. The second base station 30 can transmit a signal of an event through the second wireless communications network to the portable terminal 10.

The portable terminal 10 is a dual standby portable terminal that can simultaneously connect to at least two wireless communications networks. For example, the portable terminal 10 according to an exemplary embodiment of the present invention can simultaneously connect to different wireless communications networks according to two communications methods selected from among a plurality of communications methods including CDMA, GSM and WCDMA or the like, or to two networks using one communications method selected from among the plurality of communications methods.

The portable terminal 10 receives a signal of an event generation from each of the first base station 20 and the second base station 30. Here, the portable terminal 10 can receive a signal that the first wireless communications network or the second wireless communications network transmitted through one of the first base station 20 and the second base station 30. For example, the portable terminal 10 can receive a signal of an event including a short message service or a multimedia message service.

When an event is received through the wireless communications networks, the portable terminal 10 controls a screen to display data corresponding to the event. So as to display data corresponding to the event, the portable terminal 10 switches the switching unit to connect either the main controller or the sub-controller to the display unit.

Figure 2:
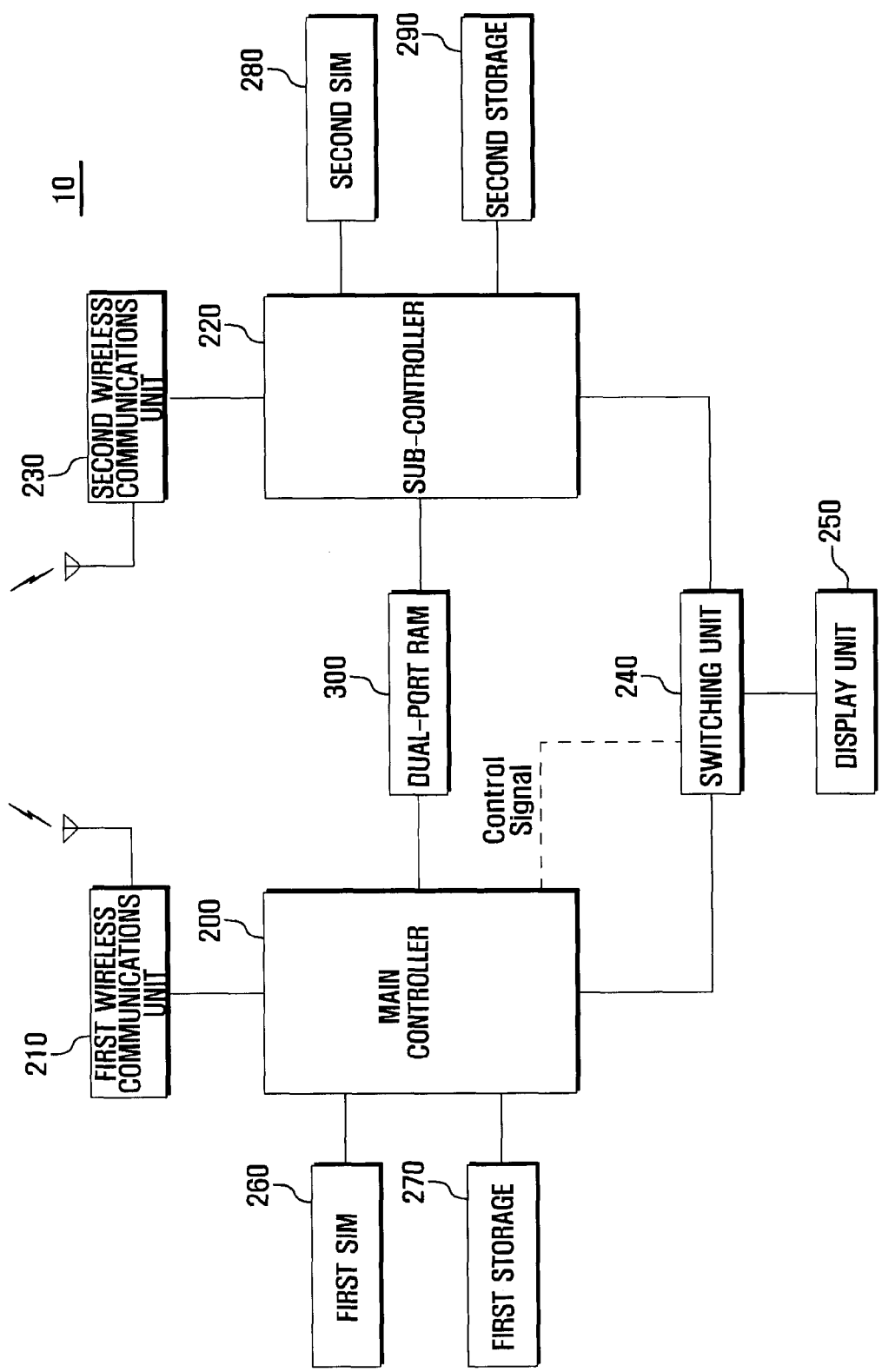
FIG. 2 is a block diagram illustrates a schematic configuration of a dual standby portable terminal according to an exemplary embodiment of the present invention.

FIG. 2 is a block diagram illustrates a schematic configuration of a dual standby portable terminal according to an exemplary embodiment of the present invention.

Referring to FIG. 2, the dual standby portable terminal 10 includes a main controller 200, a first wireless communications unit 210, a sub-controller 220, a second wireless communications unit 230, a switching unit 240, a display unit 250, a first SIM 260, a first storage 270, a second SIM 280, a second storage 290, and a dual-port RAM 300.

The first wireless communications unit 210 transmits a signal with a transmission frequency according to a wireless communications protocol of the first wireless communications network, and receives a signal of a reception frequency according to the wireless communications protocol of the first wireless communications network. This first wireless communications unit 210 includes a RF transmitter which up-converts and amplifies a transmission frequency of the transmitted signal, and a RF receiver which low-noise amplifies and down-converts the received signal (not shown).

The main controller 200 includes a transmitter which encodes and modulates a transmitted signal, and a receiver which modulates and decodes the received signal. At this time, a data processing unit can be comprised of a modem and a codec (not shown).

The main controller 200 processes a signal periodically received from the first base station 20 (FIG. 1), in case of connecting to the first wireless communications network through the first wireless communications unit 210 in a standby mode. If an event is received, the main controller 200 can display data corresponding to the event on the display unit 250.

In case control information that requests a connection with the display unit 250 is transmitted from the sub-controller 220, the main controller 200 can transmit a screen control switching signal that enables the display unit 250 and the sub-controller 220 to form an interface path through the switching unit 240. The main controller 200 can receive control information through the dual-port RAM 300. The main controller 200 can output data corresponding to event to the display unit 250.

The second wireless communications unit 230 performs a communication with the second base station 30 (FIG. 1). Here, the second wireless communications unit 230 can connect to the second wireless communications network through the second base station 30. As the basic configuration of the second wireless communications unit 230 is similar to a corresponding configuration of the first wireless communications unit 210, a detailed description of the second communication unit need not be provided in detail and, hence, is omitted.

The sub-controller 220 can have a basic configuration corresponding to the main controller 200. And, in a standby mode, the sub-controller 220 processes a signal periodically received from the second base station 30 through the second wireless communications unit 230. If an event is received from the second base station 30, the sub-controller 220 transmits control information to the main controller 200 that requests a connection with the display unit 250 in order to display data corresponding to the event. The sub-controller 220 can then output data corresponding to the event to the display unit 250.

According to the control signal received from the main controller 200, the switching unit 240 connects the main controller 200 with the display unit 250, or connects the sub-controller 220 with the display unit 250. In case of the default state, for example, when both of the main controller 200 and the sub-controller 220 are in a standby mode, the switching unit 240 can maintain the state where the main controller 200 and the display unit 250 are connected. according to the control signal, the switching unit 240 provides an interface path that sends screen data outputted from the main controller 200 or screen data outputted from the sub-controller 220 to the display unit 250.

The display unit 250 displays the state of a series of operations performed in the portable terminal 10, the result of operations, and a plurality of information. Moreover, the display unit 250 displays a menu of operations available within the portable terminal 10 and user data inputted by user to the screen. Here, the display unit 250 can be implemented with the LCD (Liquid Crystal Display) or other technologies (e.g., electrophortic, LED). Particularly, the display unit 250 according to an exemplary embodiment of the present invention can be controlled by the main controller 200 or the sub-controller 220. Here, the display unit 250 receives and displays the transmitted data corresponding to events from the main controller 200 or the sub-controller 220.

The first SIM 260 and the second SIM 280 represent smart cards. At this time, the first SIM 260 and the second SIM 280 can perform an ICC (IC Card) function that may be used to provide an identification of the phone and the communication protocol or may be used for a storage device.

For example, assuming that the main controller 200 supports CDMA or GSM and the sub-controller 220 supports GSM, a user can use as a GSM-GSM dual standby portable terminal 10 by adhering the first and second SIMs 260 and 280 as a SIM for GSM.

The first and second SIMs 260 and 280 have a built-in service identifier, and can be used for the authentication for the connection to a corresponding provider network for performing the radio communications according to a corresponding wireless communications protocol, the encoding, and the tunneling for encoding or the like.

The first SIM 260 and the second SIM 280 are inserted into a card connection unit (not shown) which performs an interface, so that the first SIM 260 and the second SIM 280 are controlled by the main controller 200 and the sub-controller 220, respectively. That is, the first SIM 260 and the second SIM 280 can transmit an input/output signal through the card connection unit under the control of the main controller 200 and the sub-controller 220. The card connection unit is equipped with a slot to which the first SIM 260 and the second SIM 280 are inserted so that the mounting and separation of the first SIM 260 and the second SIM 280 can be performed. Here, the portable terminal 10 is equipped with one SIM which can connect to at least two communications methods. That is the card connection unit possesses one slot.

The first storage 270 and the second storage 290 store a program and data necessary for the operation of the dual standby portable terminal according to an exemplary embodiment of the present invention. Here, the first storage 270 and the second storage 290 can store a program and data necessary for the connection to the first wireless communications network and the second wireless communications network, respectively. At this time, the first storage 270 and the second storage 290 can store a program and data for controlling a screen according to the event generation. The first storage 270 and the second storage 290 can be controlled by the main controller 200 and the sub-controller 220 respectively.

The dual-port RAM 300 is capable of reading and writing data relating to the operation of the portable terminal 10. Particularly, the sub-controller 220 according to an exemplary embodiment of the present invention can store control information which requests a connection with the display unit 250 in order to display data corresponding to events, in the dual-port RAM 300. The main controller 200 can receive control information through the dual-port RAM 300.

Figure 3:
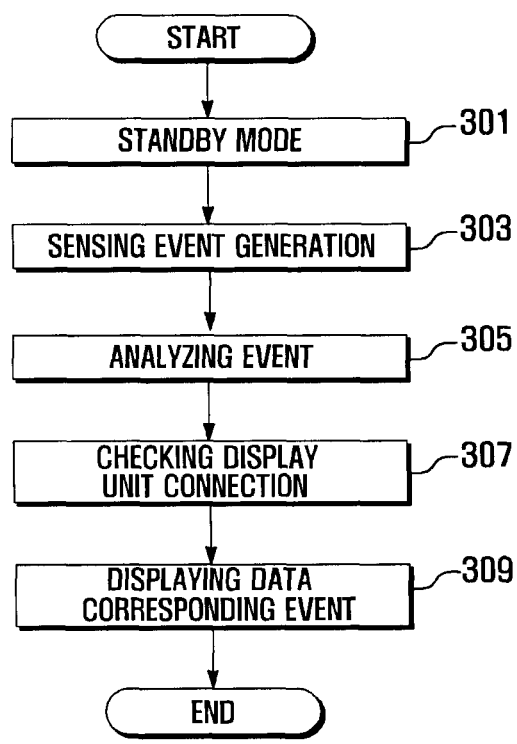
FIG. 3 is a flowchart illustrating the operation of a dual standby portable terminal according to an exemplary embodiment of the present invention.

FIG. 3 is a flowchart illustrating operation of a dual standby portable terminal according to an exemplary embodiment of the present invention.

Referring to FIG. 3, each of the main controller 200 and the sub-controller 220 can maintain a standby mode (301). At this time, the main controller 200 can connect to a wireless communications network through the first wireless communications unit 210, and the sub-controller 220 can connect to the wireless communications network through the second wireless communications unit 230.

The main controller 200 can sense a signal according to an event generation during the standby mode (303). At this time, the sensed event can be an event received through the first wireless communications unit 210. In the meantime, in case the sub-controller 220 senses an event, the sensed event can be an event received through the second wireless communications unit 230. Here, the event can be a service which can be displayed on the display unit 250 of the portable terminal 10 like the short message service and the multimedia message service.

If the event generation is sensed by the main controller 200, the event is analyzed (305), and the connection state of the display unit 250 can be checked so as to display data corresponding to the event (307). Here, when both of the main controller 200 and the sub-controller 220 are in the standby mode, the main controller 200 can maintain the state of being connected to the display unit 250 through the switching unit 240. That is, the main controller 200 can display data corresponding to the sensed event to the display unit 250 (309) in a default mode.

In the meantime, if an event is sensed by the sub-controller 220, the sub-controller 220 can transmit the control information to the main controller 200 so as to display data corresponding to the event to the display unit 250. At this time, the control information is information that the sub-controller 220 requests a connection with the display unit 250. Then, the sub-controller 220 can be informed from the main controller 200 that it is connected to the display unit 250. Then, the sub-controller 220 can display data corresponding to the sensed event to the display unit 250.

Figure 4:
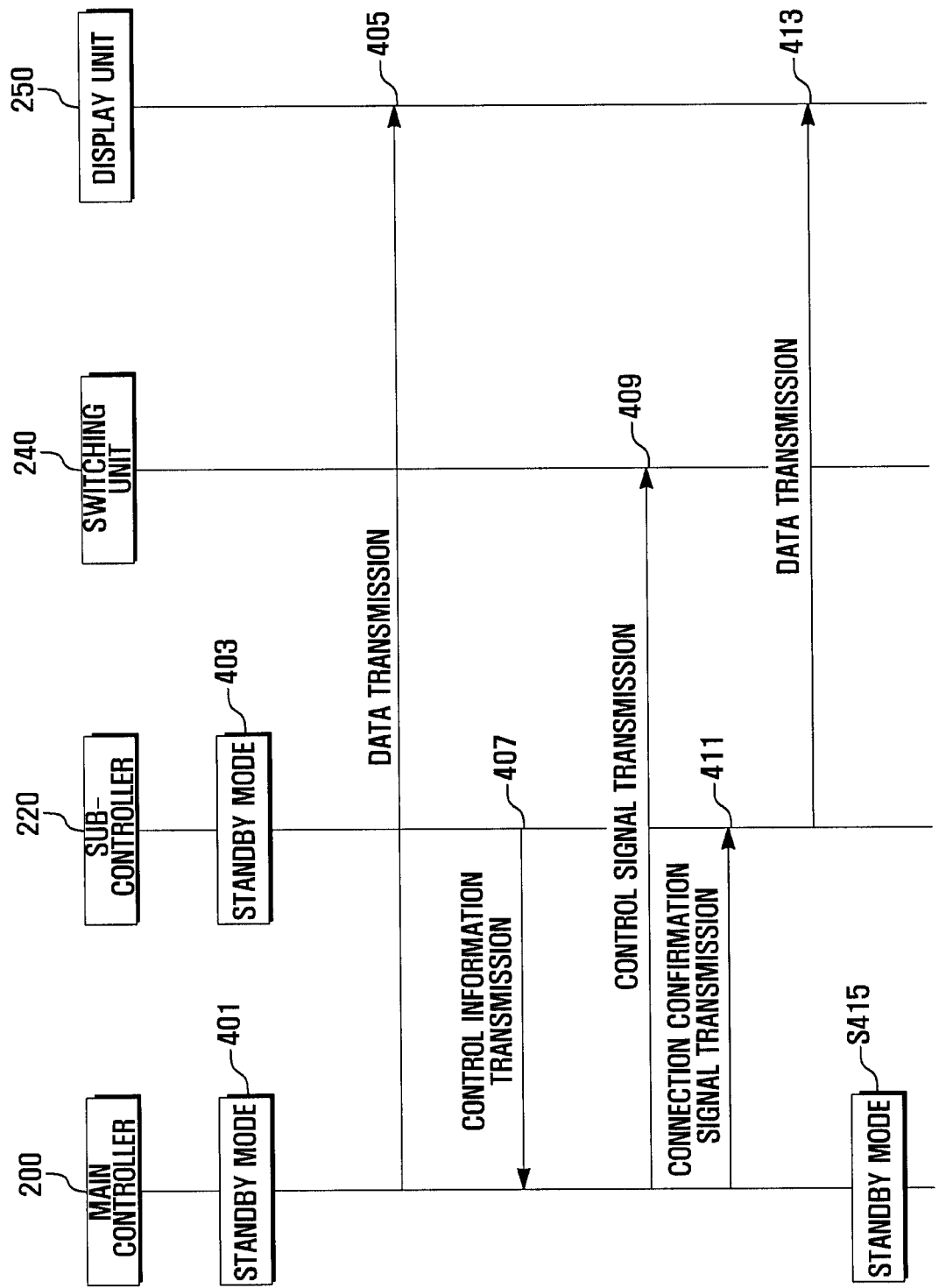
FIG. 4 illustrates the operation of controlling a display unit by a main controller of a dual standby portable terminal according to an exemplary embodiment of the present invention.

FIG. 4 illustrates operation of controlling a display unit by a main controller of a dual standby portable terminal according to an exemplary embodiment of the present invention.

Referring to FIG. 4, the main controller 200 and the sub-controller 220 of the dual standby portable terminal according to an exemplary embodiment of the present invention are in a standby mode state (401, 403). At this time, the main controller 200 can sense a signal according to the event generation. Here, the event can include a service which can be displayed to the display unit 250 of the portable terminal 10 like the short message service and the multimedia message service.

If an event is received through the first wireless communications unit 210, the main controller 200 transmits data corresponding to the event to the display unit 250 (405). At this time, the main controller 200 controls the display unit 250 and displays data corresponding to the event. Here, the display unit 250 is connected to the main controller 200 when both of the main controller 200 and the sub-controller 220 are in the standby mode.

The main controller 200 can receive control information from the sub-controller 220 while controlling the display unit 250 (407). Here, the control information is information that the sub-controller 220 requests of the main controller 200 a connection with the display unit 250 in order to display data corresponding to the event. The control information can be transmitted through the dual-port RAM 300.

The main controller 200 transmits a control signal to the switching unit 240 (409). The control signal can be a screen control switching signal for connecting the display unit 250, which is connected to the main controller 200, to the sub-controller 220. Here, if the screen control switching signal is transmitted, the switching unit 240 terminates the connection of the display unit 250 and main controller 200, and connects the sub-controller 220 to the display unit 250.

If the sub-controller 220 is connected to the display unit 250, the main controller 200 can transmit a connection confirmation signal to the sub-controller 220 (411). The connection confirmation signal is a signal which notifies the state of connection between the sub-controller 220 and the display unit 250 to the sub-controller 220 according to the change of connection state that is changed when the main controller 200 controls the switching unit 240. Then, the sub-controller 220 transmits data corresponding to the event to the display unit 250 (413). Here, the sub-controller 220 controls the display unit 250 to display data corresponding to event. Then, the main controller 200 maintains a standby mode during the period the data corresponding to the event sensed by the sub-controller 220 are displayed (415).

Figure 5:
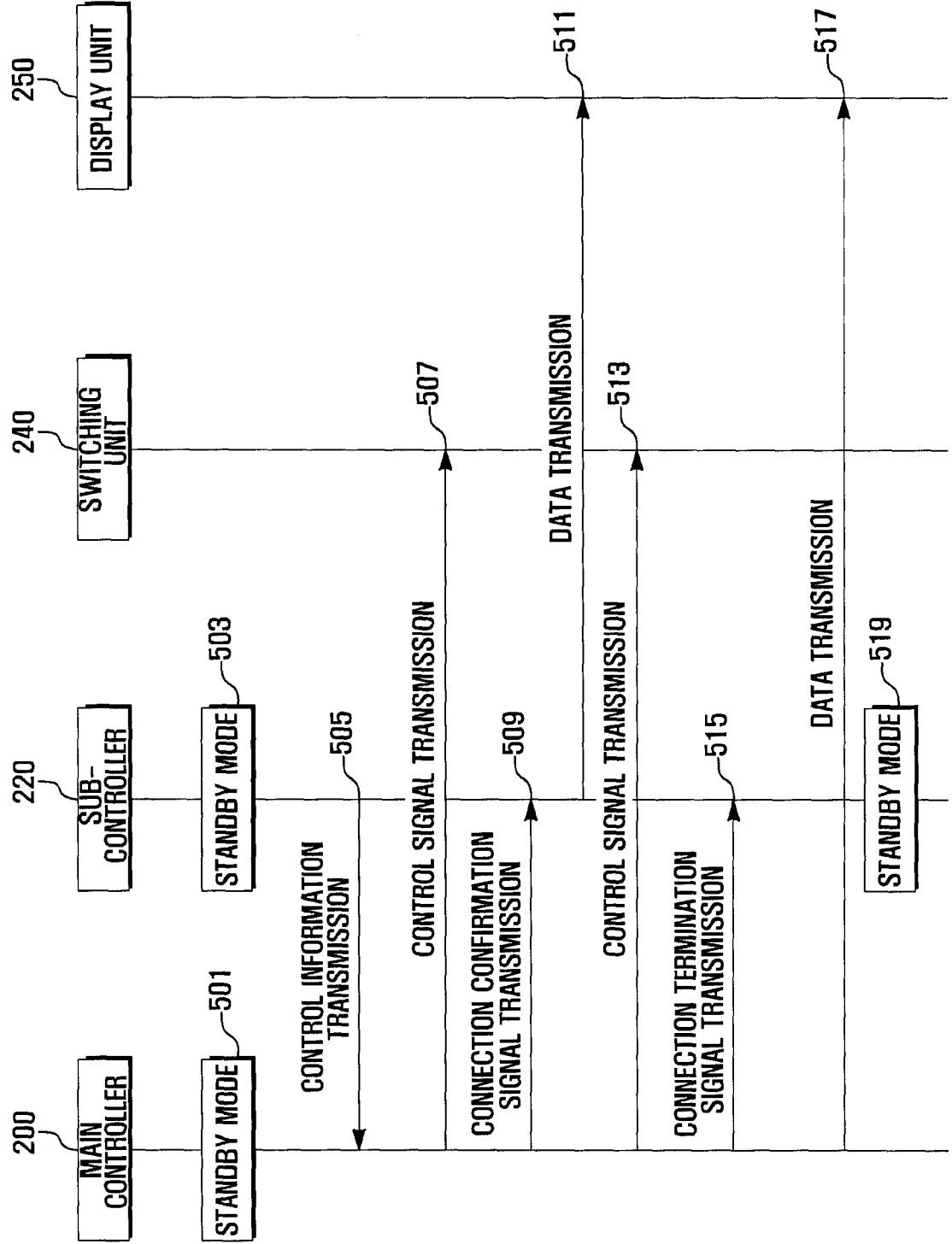
FIG. 5 illustrates the operation of controlling a display unit by a sub-controller of a dual standby portable terminal according to an exemplary embodiment of the present invention.

FIG. 5 illustrates operation of controlling a display unit by a sub-controller of a dual standby portable terminal according to an exemplary embodiment of the present invention.

Referring to FIG. 5, the main controller 200 and the sub-controller 220 of the dual standby portable terminal according to an exemplary embodiment of the present invention are in a standby mode state (501, 503). The sub-controller 200 can sense a signal according to the event generation. Here, the event can include a service that can be displayed by the display unit 250 similar to the short message service and the multimedia message service.

If an event is received through the second wireless communications unit 230, the sub-controller 220 transmits control information to the main controller 200 (505). Here, the control information is information that the sub-controller 220 requests of the main controller 200 a connection with the display unit 250 so as to display data corresponding to the event on screen. The request may be transmitted through the dual-port RAM 300.

After the control information is received by the main controller 200, the main controller 200 transmits a control signal to the switching unit 240 (507). The control signal can be a screen control switching signal for connecting the display unit 250 to the sub-controller 220. Thus, after the screen control switching signal is transmitted, the switching unit 240 terminates the connection between the display unit 250 and the main controller 200, a connection between the sub-controller 220 and the display unit 250 is created. In the present invention, the display unit 250 is connected to the main controller 200 in case both of the main controller 200 and the sub-controller 220 are in a standby mode.

If the sub-controller 220 is connected to the display unit 250, the main controller 200 can transmit a connection confirmation signal to the sub-controller 220 (509). The connection confirmation signal is a signal which notifies the sub-controller 220 of the state of the connection between the sub-controller 220 and the display unit 250. Thereafter, the sub-controller 220 transmits data corresponding to the event to the display unit 250 (511). Here, the sub-controller 220 controls the display unit 250 to display data corresponding to event.

The main controller 200 can also sense the event generation through the first wireless communications unit 210 while the display unit 250 is controlled by the sub-controller 220. At this time, the main controller 200 can transmit a control signal to the switching unit 240 (513) to connect the display unit 250, which is connected to the sub-controller 220, back to the main-controller 200. Here, if the screen control switching signal is transmitted, the switching unit 240 terminates the connection between the sub-controller 220 and the display unit 250, and connects the main controller 200 to the display unit 250.

If the control signal is transmitted, the main controller 200 can transmit a connection termination signal to the sub-controller 220 (515). Here, the connection termination signal notifies the sub-controller 220 of the connection termination between the sub-controller 220 and the display unit 250.

The main controller 200 next transmits data corresponding to the event to the display unit 250 (517). Here, the main controller 200 controls the display unit 250 to display data corresponding to event. Then, the sub-controller 220 maintains a standby mode during this period as data corresponding to the event are displayed by the main controller 200 (519).

Figure 6:
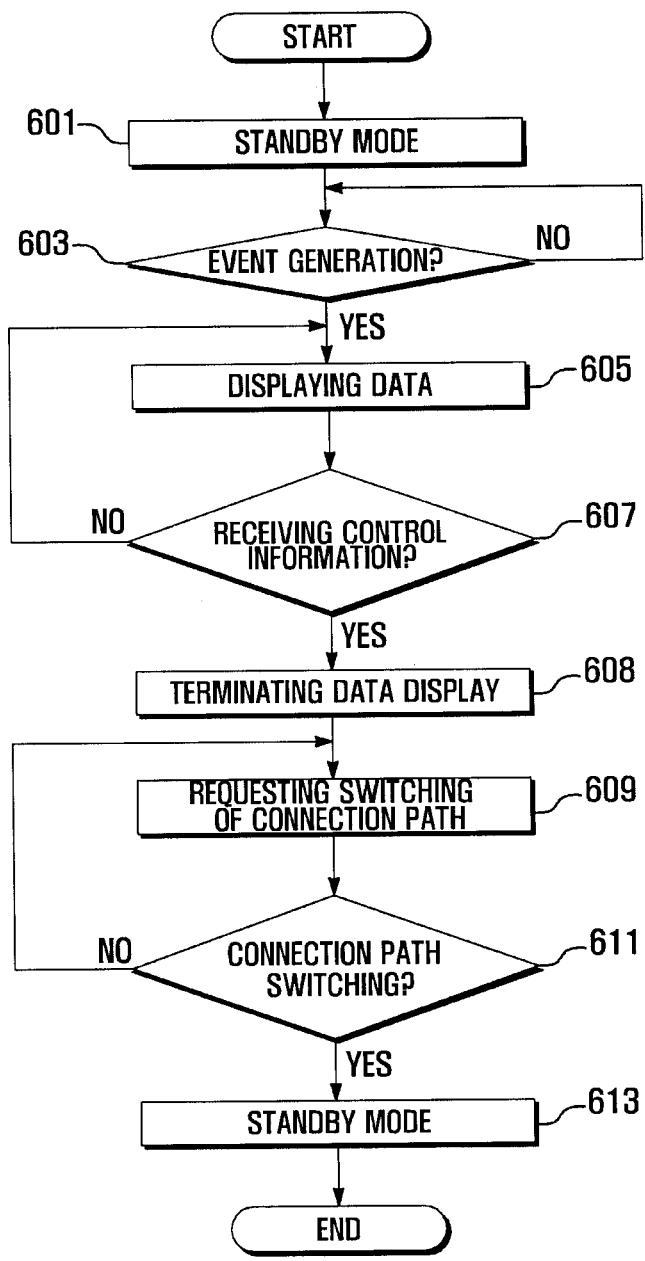
FIG. 6 is a flowchart illustrating the operation of a main controller of a dual standby portable terminal according to an exemplary embodiment of the present invention.

FIG. 6 is a flowchart illustrating operation of a main controller of a dual standby portable terminal according to an exemplary embodiment of the present invention.

Referring to FIG. 6, the main controller 200 is in a standby mode state (601), while the display unit 250 is set to be connected to the main controller 200.

The main controller 200 can receive an event generation signal through the first wireless communications unit 210 (603).

If an event is received, the main controller 200 can provide data corresponding to the received event, to the display unit 250 (605). At this time, the main controller 200 is connected to the display unit 250 through the switching unit 240. However, even if an event is not generated, the main controller 200 maintains the standby mode.

The main controller 200 can sense the control information received from the sub-controller 220 while displaying data corresponding to the event (607). Here, control information represents information that the sub-controller 220 uses to request of the main controller 200 a connection with the display unit 250 so as to display data corresponding the event. The request information can be transmitted through the dual-port RAM 300.

When the control information is received, the main controller 200 terminates a data display corresponding to the previously received event (608). In the meantime, if the control information is not received, the main controller 200 continuously displays data corresponding to the previously received event(s).

The main controller 200 can switch the connection path of the display unit 250 (609). The main controller 200 can request a connection path switching of the switching unit 240. Thus, the switching unit 240 terminates the connection between the main controller 200 and the display unit 250, and connects the sub-controller 220 to the display unit 250. Here, the main controller 200 can transmit a confirmation signal that informs the sub-controller 220 of the connection with the display unit 250.

The main controller 200 can check whether the connection path is switched to the display unit 250 (611). Here, the main controller 200 can maintain a standby mode in case the sub-controller 220 is connected to the display unit 250 (613). In the meantime, if the connection path is not switched, the main controller 200 performs the process of requesting the switching of connection path to the switching unit 240.

Figure 7:
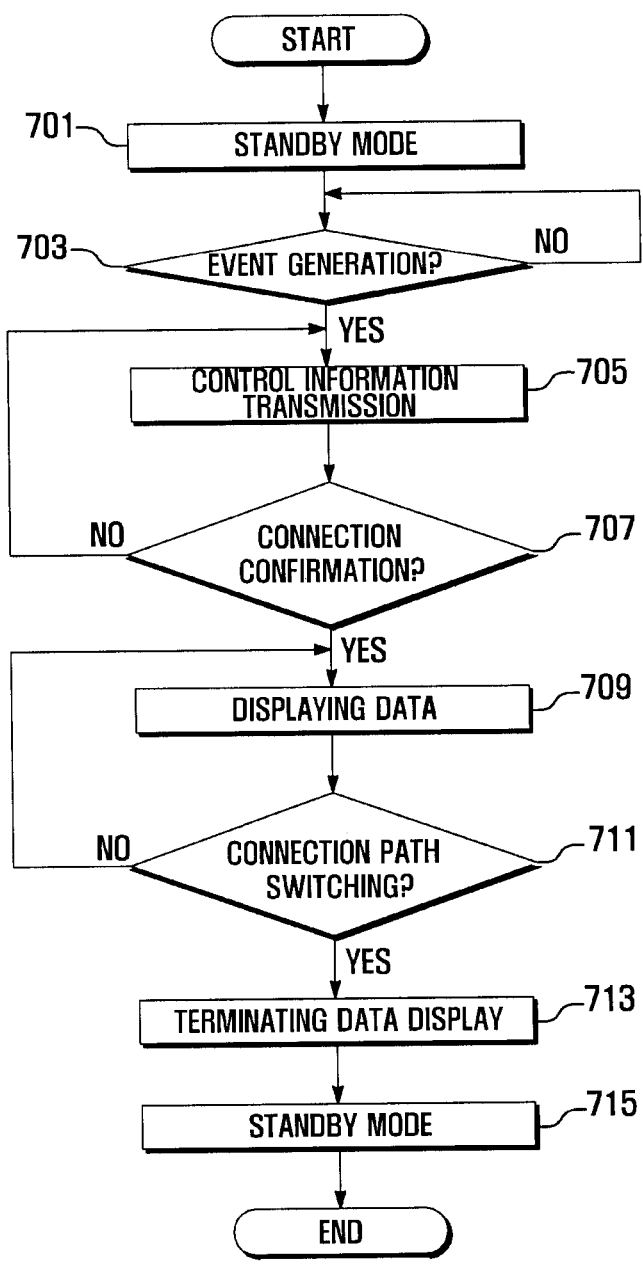
FIG. 7 is a flowchart illustrating the operation of a sub-controller of a dual standby portable terminal according to an exemplary embodiment of the present invention.

FIG. 7 is a flowchart illustrating operation of a sub-controller of a dual standby portable terminal according to an exemplary embodiment of the present invention.

Referring to FIG. 7, the sub-controller 220 is in a standby mode state (701), and the display unit 250 is set to be connected to the main controller 200 in the standby mode state.

The sub-controller 220 can receive an event generation signal through the second wireless communications unit 220 (703).

If an event is received, the sub-controller 220 transmits control information to the main controller 200 (705). Here, the control information represents information that the sub-controller 220 sends to the main controller 200 to request a connection with the display unit 250 so as to display data corresponding to the received event. The request can be transmitted through the dual-port RAM 300.

The sub-controller 220 checks a connection path with the display unit 250 (707). When the connection path with the display unit 250 is set, the sub-controller 220 can display data corresponding to the event to the display unit 250 (709). Here, the sub-controller 220 determines whether a connection confirmation signal is received from the main controller 200 and can check the connection with the display unit 250. In the meantime, if it is not connected to the display unit 250, the sub-controller 220 performs the process of transmitting the control information to the main controller 200.

The sub-controller 220 checks whether the connection path is switched to the display unit 250 (711). If the connection is switched, the sub-controller 220 terminates the display of data corresponding to event (713). However, if connection is not switched, the sub-controller 220 can continuously display data corresponding to the received event(s) to the display unit 250. When the connection with the display unit 250 is terminated, the sub-controller 220 is maintained in a standby mode (715).

In the embodiment of the present invention, if the display of data corresponding to an event is terminated by the sub-controller 220, the display unit 250 can enter the standby mode and can be automatically connected to the main controller 200.

In the meantime, in the above, it is illustrated that the switching unit is controlled in such a manner that the sub-controller and the display unit form an interface path when an event is sensed by the sub-controller 220, so that the sub-controller outputs information corresponding to the event to the display unit. However, the present invention is not limited only to this operation. For example, in case a character message, or a multimedia message are received through the second wireless communications unit during a period when the display unit is controlled by the main controller, the present invention can provide information regarding this configuration to the sub-controller. The main controller can output an icon or a pop up message that informs the user of the reception of message or the reception of multimedia message to the display unit. Then, in case a user requests to check the text message or the multimedia message received through the second wireless communications unit, the main controller can transmit a control signal to the switching unit so that the sub-controller and the display unit can form an interface path.

Furthermore, the present invention can control the switching unit so that the sub-controller and the display unit may be connected, in case of requesting to output large volume image stored in the second storage to the display unit besides the event generation such as the reception of the text message or the multimedia message through the second wireless communications unit.

According to the present invention described in the above, in order to display data corresponding to an event to the screen, it is enough for the sub-controller to transmit the control information according to the generation of event to the main controller, so that a small amount of dual-port RAM can be used. Furthermore, in the dual standby portable terminal, while one of two controllers control the display unit 250, the other controller is maintained in a standby mode, such that the power consumption can be reduced.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood by those skilled in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A display method of a dual standby portable terminal comprising a display unit, the method comprising:

providing a main controller and a sub-controller in the dual standby portable terminal, wherein both of the main controller and the sub-controller are for performing the same predetermined functions in the dual standby portable terminal;

operating both of the main controller and the sub-controller simultaneously together at all times to each be connected to a first communications network and a second communications network, respectively, to receive an event from the first communications network or from the second communications network, respectively, wherein the event is associated with at least one of a short message service and a multimedia service;

checking a connection state of a switching unit, when the main controller senses the event;

displaying data corresponding to the event on the display unit by the main controller, when the main controller is connected to the display unit by the switching unit;

requiring, before causing the switching unit to connect the display unit to the sub-controller to display data corresponding to the event on the display unit, the receipt at the main controller of control information from the sub-controller; and performing a function corresponding to the event using the main controller or the sub-controller, depending on the connection status of the main controller or the sub-controller to the display unit.

2. The display method of claim 1, wherein the control information is information that the sub-controller requests of the main controller a connection with the display unit, when the sub-controller senses the event.

3. The display method of claim 1, wherein connecting the display unit comprises:
transmitting a control signal for switching a connection with the display unit to the switching unit; and
transmitting a connection confirmation signal of the display unit and the sub-controller to the sub-controller, when the control signal is transmitted.

4. The display method of claim 3, further comprising, in the sub-controller, displaying data corresponding to the event on the display unit, when the connection confirmation signal is received.

5. The display method of claim 3, wherein the connection confirmation signal is a signal that notifies the sub-controller of a state of connection between the sub-controller and the display unit according to the change of connection state which is changed when the main controller controls the switching unit.

6. The display method of claim 1, further comprising, in the main controller, entering a standby mode, when the connection with the display unit is switched to the sub-controller.

7. The display method of claim 1, further comprising, in the sub-controller, entering a standby mode, when a connection termination signal is transmitted from the main controller.

8. The display method of claim 7, wherein the connection termination signal is a signal that notifies the sub-controller of the state of connection termination between the sub-controller and the display unit.

9. A dual standby portable terminal, comprising:
a main controller and a sub-controller, both for performing the same predetermined functions in the dual standby portable terminal, and both operating simultaneously together at all times, to each be connected to a first communications network and a second communications network, respectively, to receive an event from the first communications network or from the second communications network, respectively, wherein the event is associated with at least one of a short message service and a multimedia service;
a display unit for displaying data corresponding to the received event;
a switching unit which switches an input connection of the display unit to a respective one of the main controller and the sub-controller according to a control signal;
wherein the sub-controller transmits control information to the main controller in order to display on the display unit data corresponding to the event received over the second communications network;
wherein the main controller transmits the control signal to the switching unit when the control information is received from the sub-controller, for switching the input connection of the display unit to the sub-controller; and
wherein a function corresponding to the event is performed using the main controller or the sub-controller, depending on the connection status of the main controller or the sub-controller to the display unit.

10. The dual standby portable terminal of claim 9, wherein the control information is information which requests a connection of the display unit to the main controller, when the sub-controller senses the event.

11. The dual standby portable terminal of claim 9, wherein the main controller transmits to the sub-controller a connection confirmation signal of the display unit and the sub-controller, when the control signal is transmitted.

12. The dual standby portable terminal of claim 11, wherein the connection confirmation signal is a signal which notifies the sub-controller of a state of connection between the sub-controller and the display unit.

13. The dual standby portable terminal of claim 9, wherein the main controller enters a standby mode, when the connection with the display unit is switched to the sub-controller.

14. The dual standby portable terminal of claim 9, wherein the sub-controller enters a standby mode, when a connection termination signal is transmitted from the main controller.

15. The dual standby portable terminal of claim 14, wherein the connection termination signal is a signal which notifies the sub-controller of the state of connection termination between the sub-controller and the display unit.

16. An apparatus for managing a display screen in a dual standby terminal comprising:
first and second processors, both for performing the same predetermined functions in the dual standby portable terminal, and both operating simultaneously together at all times, to each be connected to a first communications network and a second communications network, respectively, to receive a first event from the first communications network or a second event from the second communications network, respectively, wherein the first and second events are associated with at least one of a short message service and a multimedia service;
wherein the first processor is in communication with a first memory, the first memory including code which when accessed by the first processor causes the first processor to receive a first event from a first receiving system associated with the first communications system;
wherein the second processor is in communication with a second memory, the second memory including code which when accessed by the second processor causes the second processor to receive a second event from a second receiving system associated with the second communications system;
a display unit for displaying information associated with at least one of the first event and the second event;
a switching unit for receiving control inputs from the first processor for switching an input of the display between an output of each of the first and second processors;
a dual-port RAM in communication with the first and second processors, wherein control information in the dual-port RAM causes the switching unit to create a path between the second processor and the display unit; and
wherein functions corresponding to the first event and the second event are performed using the first processor or the second processor, depending on the connection status of the first processor or the second processor to the display unit.

17. The apparatus of claim 16, wherein the switching unit creates as a default path a path between the first processor and the display unit.

18. The apparatus of claim 17, wherein the switching unit maintains the path between the second processor and the display unit until the first event is received by the first processor.

\* \* \* \* \*